United States Patent
Nakamura

(10) Patent No.: US 9,363,623 B2
(45) Date of Patent: Jun. 7, 2016

(54) COMMUNICATION SYSTEM, COMMUNICATION METHOD, AND NON-TRANSITORY COMPUTER-READABLE MEDIUM

(71) Applicant: Shigeru Nakamura, Kanagawa (JP)

(72) Inventor: Shigeru Nakamura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/511,406

(22) Filed: Oct. 10, 2014

(65) Prior Publication Data

US 2015/0111566 A1    Apr. 23, 2015

(30) Foreign Application Priority Data

Oct. 21, 2013    (JP) ................................. 2013-218705

(51) Int. Cl.
| | |
|---|---|
| *H04W 4/00* | (2009.01) |
| *G06F 9/445* | (2006.01) |
| *H04M 3/56* | (2006.01) |

(52) U.S. Cl.
CPC ................. *H04W 4/001* (2013.01); *G06F 8/65* (2013.01); *H04M 3/56* (2013.01); *H04M 2250/64* (2013.01)

(58) Field of Classification Search
CPC combination set(s) only.
See application file for complete search history.

(56) References Cited

U.S. PATENT DOCUMENTS

| | | | |
|---|---|---|---|
| 7,716,660 B2 | 5/2010 | Mackay | |
| 2004/0199659 A1* | 10/2004 | Ishikawa et al. | 709/235 |
| 2009/0217331 A1* | 8/2009 | Park et al. | 725/103 |
| 2012/0072895 A1 | 3/2012 | Koyama et al. | |

FOREIGN PATENT DOCUMENTS

| | | |
|---|---|---|
| JP | 2006-172472 | 6/2006 |
| JP | 2012-084118 | 4/2012 |
| JP | 2015-5061 A | 1/2015 |

* cited by examiner

*Primary Examiner* — Kabir A Timory
(74) *Attorney, Agent, or Firm* — Oblon, McClelland, Maier & Neustadt, L.L.P.

(57) ABSTRACT

A communication system includes a division size determining unit configured to determine a division size when update data for an application that is executed by a first communication device is divided into a plurality of pieces of data based on band information indicating a band capable of being used for communication by the first communication device, a dividing unit configured to divide the update data into a plurality of pieces of data using the division size determined by the division size determining unit, and a relevant information generation unit configured to generate relevant information relating to the pieces of data divided by the dividing unit. In the communication system, a second communication device transmits the relevant information to the first communication device, and the first communication device receives the update data divided into the division size so as to perform update in accordance with the relevant information.

5 Claims, 15 Drawing Sheets

| BAND INFORMATION | DIVISION SIZE |
|---|---|
| LOWER THAN 128 Kbps | 128 [KByte] |
| EQUAL TO OR HIGHER THAN 128 Kbps LOWER THAN 512 Kbps | 512 [KByte] |
| EQUAL TO OR HIGHER THAN 512 Kbps | 1024 [KByte] |

FIG.8

```
{
  "version": "1.0.2",
  "dependency": "1.0.1",
  "description": "It is sample data.",
  "files": [
    {
      "url": "https://update.example.jp/1.0.2/1.dat",
      "digest": "e04964afb440de12b4e8245cf575daa01124641e"
    },
    {
      "url": "https://update.example.jp/1.0.2/2.dat",
      "digest": "74673bfc48d2332565d7fa628e0a5f4070b7414f"
    },
    {
      "url": "https://update.example.jp/1.0.2/3.dat",
      "digest": "ed048f0ff271d88a916bfb2646811fa0f2b9ac16"
    },
  ]
  "scriptname": "update.dup",
  "require_reboot": "true",
  "force_update": "true"
}
```

| TIME | AVERAGE VALUE OF BAND USED FOR DOWNLOAD |
|---|---|
| 2013/6/3 | 300 [Kbps] |
| 2013/3/1 | 430 [Kbps] |
| 2012/12/1 | 280 [Kbps] |

COMMUNICATION SYSTEM, COMMUNICATION METHOD, AND NON-TRANSITORY COMPUTER-READABLE MEDIUM

CROSS-REFERENCE TO RELATED APPLICATIONS

The present application claims priority to and incorporates by reference the entire contents of Japanese Patent Application No. 2013-218705 filed in Japan on Oct. 21, 2013.

BACKGROUND OF THE INVENTION

1. Field of the Invention

The present invention relates to a communication system, a communication method, and a non-transitory computer-readable medium.

2. Description of the Related Art

Conference systems that hold a remote conference between users at remote places through a communication network such as the Internet have been widely used. With the conference system, in a conference room in which one of parties such as attendees that have the remote conference is, images of the conference room of the party in the conference and audio such as remarks thereof are image-captured and collected using a terminal device of the remote conference system. Then, they are converted to digital data and transmitted to a terminal device of the other party. In a conference room of the other party, the images are displayed on a display and the audio is output through a speaker. Thus, known have been techniques of holding a conference between users at remote places in a state close to an actual conference.

In the conference system, firmware (programs and applications) is periodically updated in some cases in order to improve call security performance and operation performance. The following method has been known as a method of updating the program in the conference system. That is, update data and meta information (metadata) are acquired by accessing a server through a network so as to update the program and a program of a version that depends on this program.

Japanese Patent Application Laid-open No. 2006-172472 discloses the following method. The method includes receiving a computing device list for identifying computing devices from which each portion of a plurality of portions can be downloaded and updating software of a computing device that downloads the respective portions from a plurality of computing devices.

Japanese Patent Application Laid-open No. 2012-084118 discloses the following update method. The update method includes determining whether update necessary for a communication device is present, receiving a selection operation whether the update is executed from a user when the update is present, and executing the update when the selection operation for executing the update is made.

In the conventional systems performing update, when network cutoff occurs during downloading or a terminal is powered OFF before downloading is completed, data downloaded partway disappears and download of the data should be restarted from the beginning. This results in the problem of an increased download time. In order to solve this problem, considered is a method in which download data is divided and divided pieces of data are downloaded, and all the divided pieces of data are coupled and updated after being downloaded. This method eliminates the necessity of downloading pieces of data that have been already downloaded again even when the power supply is cut off unintentionally as long as they have been completely downloaded on a basis of the divided data, thereby preventing the download time from being increased.

When the power supply is cut off while the divided data is downloaded, a terminal that can use only a narrow band re-downloads the data with increased frequency, resulting in increase in the download time. When a division size of the download data is made small in order to solve this problem, overhead for downloading the respective pieces of divided data is increased and efficiency becomes worse. In particular, a terminal that can use a broad band has more disadvantages than advantages. Thus, an appropriate divided data size is different depending on usable network bands of the terminals. This arises a problem in that not all the terminals can download data efficiently with a single divided data size.

Therefore, it is desirable to provide a communication system, a communication method, and a non-transitory computer-readable medium capable of updating applications efficiently for any of a plurality of communication devices having different usable communication bands.

SUMMARY OF THE INVENTION

It is an object of the present invention to at least partially solve the problems in the conventional technology.

According to an aspect of the present invention, there is provided a communication system including a first communication device and a second communication device, the communication system including: a division size determining unit configured to determine a division size when update data for an application that is executed by the first communication device is divided into a plurality of pieces of data based on band information indicating a band capable of being used for communication by the first communication device; a dividing unit configured to divide the update data into a plurality of pieces of data in accordance with the division size determined by the division size determining unit; and a relevant information generation unit configured to generate relevant information relating to the pieces of data divided by the dividing unit, wherein the second communication device transmits the relevant information to the first communication device, and the first communication device receives the update data divided into the division size to perform update in accordance with the relevant information.

According to another aspect of the present invention, there is provided a communication method that is performed by a communication system including a first communication device and a second communication device, the communication method including: determining a division size when update data for an application that is executed by the first communication device is divided into a plurality of pieces of data based on band information indicating a band capable of being used for communication by the first communication device; dividing the update data into a plurality of pieces of data in accordance with the determined division size; generating relevant information relating to the pieces of divided data; transmitting, by the second communication device, the relevant information to the first communication device; and receiving, by the first communication device, the update data divided into the division size to perform update in accordance with the relevant information.

According to still another aspect of the present invention, there is provided a non-transitory computer-readable medium including computer readable program codes, performed by a computer, the program codes when executed causing the computer to execute: determining a division size when update data for an application is divided into a plurality of pieces of data based on band information indicating a band capable of being used for communication by a communication device that receives the update data to perform update; dividing the update data into a plurality of pieces of data in accordance with the determined division size; generating relevant information relating to the pieces of divided data; and transmitting the relevant information to the communication device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a conceptual view illustrating an example of metadata;

DETAILED DESCRIPTION OF THE PREFERRED EMBODIMENTS

Hereinafter, a communication system according to an embodiment will be described in detail with reference to the accompanying drawings.

Embodiment

Figure 1:
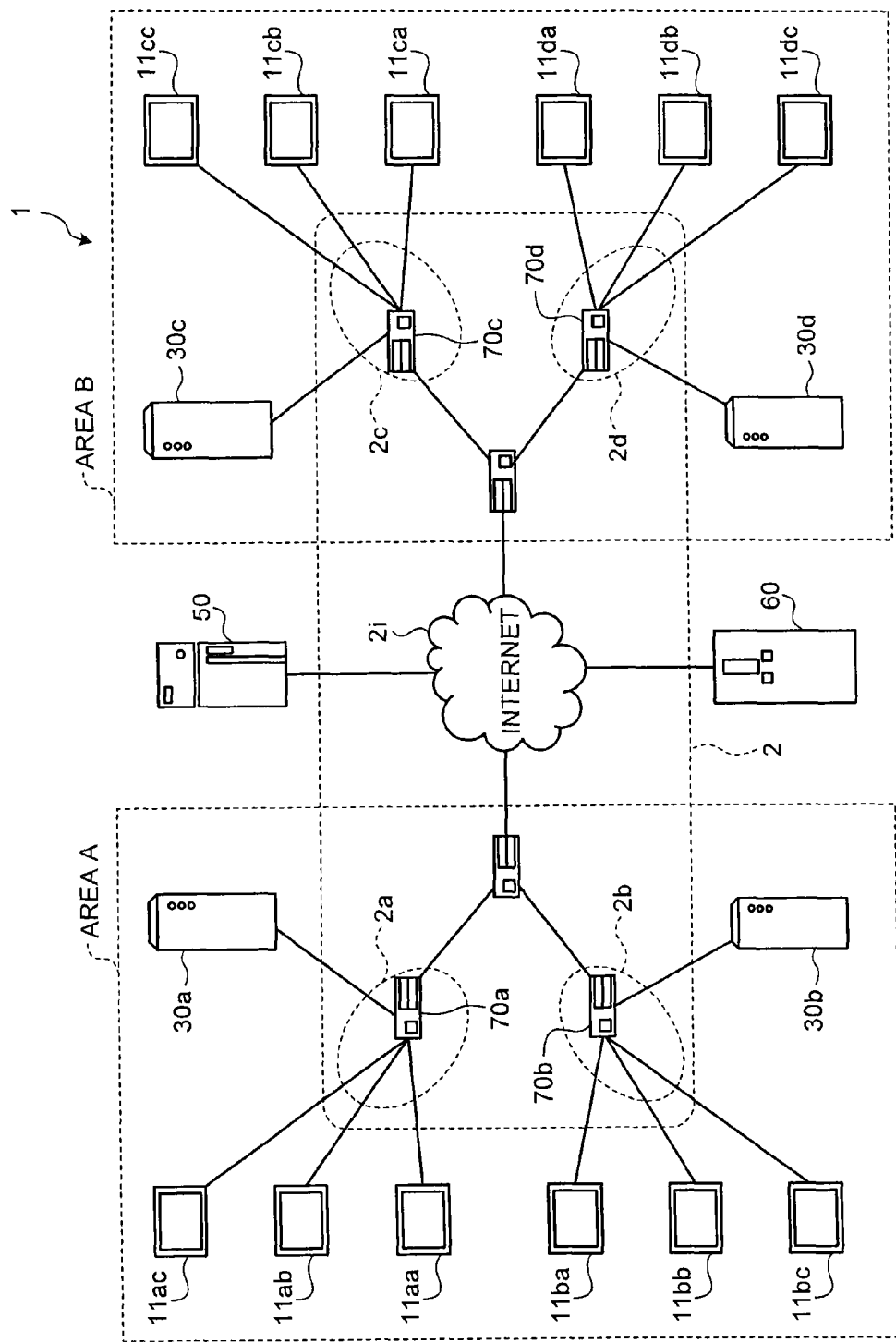
FIG. 1 is a schematic view illustrating the configuration of a remote communication system.

FIG. 1 is a schematic view illustrating the configuration of a remote communication system (communication system) 1 according to an embodiment. As illustrated in FIG. 1, the remote communication system 1 is a system in which call terminals (terminals) 11aa to 11ac, 11ba to 11bc, 11ca to 11cc, and 11da to 11dc as communication devices, a remote communication management server 50, an update server 60, and routers 70a to 70d are connected with a communication network 2 in a communicable manner. To be specific, the remote communication system 1 is configured to include LANs 2a, 2b, 2c, and 2d connected to an Internet 2i through the routers 70a to 70d, the remote communication management server 50, the update server 60, the call terminals 11aa to 11ac and a relay device 30a connected to the LAN 2a, the call terminals 11ba to 11bc and a relay device 30b connected to the LAN 2b, the call terminals 11ca to 11cc and a relay device 30c connected to the LAN 2c, and the call terminals 11da to 11dc and a relay device 30d connected to the LAN 2d. In the remote communication system 1, the respective call terminals 11aa to 11ac and 11ba to 11bc in an area A and the respective call terminals 11ca to 11cc and 11da to 11dc in an area B transmit and receive audio or video images to and from each other via relay of communication data with the relay devices 30a, 30b, 30c, and 30d establishing a call under management by the remote communication management server 50.

To be specific, the remote communication management server 50 manages pieces of information including the communication addresses of the call terminals 11aa to 11ac, 11ba to 11bc, 11ca to 11cc, and 11da to 11dc and the relay devices 30a, 30b, 30c, and 30d, the call terminals relayed by the respective relay devices 30a, 30b, 30c, and 30d, and call states of the respective call terminals. For example, when the call terminal 11aa makes a call to the call terminal 11ca, it requests the relay device 30a to relay the call to the call terminal 11ca. The relay device 30a notifies the remote communication management server 50 of start of the call of the call terminal 11aa and acquires the communication address of the relay device 30c for relaying the call to the call terminal 11ca from the remote communication management server 50. Then, the relay device 30a requests the relay device 30c to relay the call to the call terminal 11ca and the relay device 30c starts a communication session with the call terminal 11ca. Subsequently, the relay device 30c notifies the remote communication management server 50 of start of the communication session with the call terminal 11ca.

In this manner, a call between the call terminal 11aa and the call terminal 11ca is started through the relay devices 30a and 30c. The remote communication management server 50 manages a state where the call terminal 11aa and the call terminal 11ca are during the call. For example, when the remote communication management server 50 receives an inquiry about the call status of the call terminal 11aa or the call terminal 11ca from the call terminal 11ab, it returns a fact that they are online but during the call.

In the following description, when an arbitrary device among the devices of the same type is described, a reference numeral omitting alphabets subsequent to numerals is used. For example, the call terminals 11aa to 11ac, 11ba to 11bc, 11ca to 11cc, and 11da to 11dc are abbreviated as a call terminal 11. The relay devices 30a to 30d are abbreviated as a relay device 30.

The update server 60 is an update information providing device that manages pieces of update-related information of programs and various pieces of setting information of the call terminal 11 and provides the pieces of information thereof in response to a request from the call terminal 11. The pieces of update-related information include data files of all the versions from the past versions to the latest versions of the programs and the various pieces of setting information of the call terminal 11, update contents for the respective versions, and pieces of metadata (relevant information) describing information relating to division of update data, which will be described later. The update server 60 manages the pieces of data of all the versions as the pieces of update-related information because the timings at which the respective call terminals 11 update are different from one another.

For example, the call terminal 11 that updates frequently may update to the latest version only whereas the call terminal 11 that updates at a long interval may update after repeating version upgrade several times. In such a case, the call terminal 11 does not update to the latest version directly but experiences update to an old version having a dependency relation with the latest version in some cases. Thus, there is the call terminal 11 that experiences the update to the old version having the dependency relation, so that the update server 60 manages the pieces of data of all the versions as the pieces of update-related information.

There are two types of normal update and forcible update as update types. The normal update is update that is executed in order to cope with failures such as bugs and add functions.

The forcible update is update in order to execute the update forcibly with change of a device or a function that is different from the functions of the call terminal 11. For example, a data format or a video codec of audio and images that are transmitted and received in the call is changed in the relay device 30 or version-up of the relay device 30 relating to video images, such as update of an encoder, is executed in some cases. Furthermore, a communication protocol with the relay device 30 is changed in some cases. These changes involve change in the structures of the audio, the images, and the video images themselves, change in communication procedures themselves with the relay device 30 with the change of the communication protocol, or change in the functions of the relay device 30. Due to this, when the above-mentioned changes occur, the call terminal 11 before updated cannot establish a call as an original function of the call terminal 11. In such a case, the forcible update is executed for causing the call terminal 11 to adapt to the version of the relay device 30 after updated.

When there is a problem in security including the case where a security hole is found in the relay device 30, and so on, the relay device 30 performs update for coping with the security hole in order to avoid this in some cases. Also in the case, the call terminal 11 before updated cannot establish even a call, so that the forcible update is executed for causing the call terminal 11 to adapt to the coping with the security hole on the relay device 30.

Figure 2:
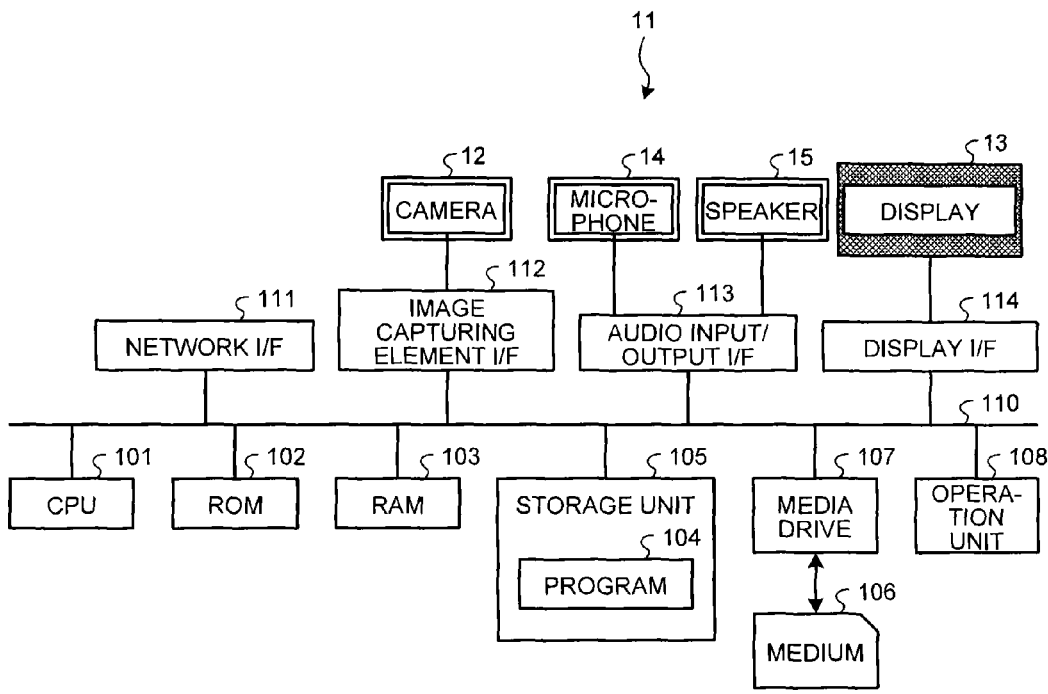
FIG. 2 is a block diagram illustrating the hardware configuration of a call terminal.

The following describes the hardware configuration of the call terminal 11. FIG. 2 is a block diagram illustrating the hardware configuration of the call terminal 11. As illustrated in FIG. 2, the call terminal 11 includes a central processing unit (CPU) 101, a read only memory (ROM) 102, a random access memory (RAM) 103, a storage unit 105, a media drive 107, an operation unit 108, a network I/F 111, an image capturing element I/F 112, an audio input/output I/F 113, and a display I/F 114 and the respective units are configured to be connected to one another through a bus 110.

The CPU 101 develops a program 104 stored in the ROM 102 or the storage unit 105 on the RAM 103 and executes it sequentially so as to control operations of the call terminal 11 centrally. The storage unit 105 is a hard disk drive (HDD), a solid state drive (SSD), or the like and stores therein data in a readable/writable manner. To be specific, the storage unit 105 stores therein the program 104 that is executed by the CPU 101 and various pieces of setting information. Upon update, the program 104 and the various pieces of setting information stored in the storage unit 105 are updated.

The media drive 107 is a drive device that performs reading/wiring from/into a medium 106 such as an optical disk. The operation unit 108 is a keyboard, various operation keys, a touch panel that is laminated and arranged on a display 13, or the like, and receives operation input by the user. The network I/F 111 is an interface that is connected to the communication network 2 and makes data communication. The image capturing element I/F 112 is an interface that is connected to a camera 12 as a digital camera and acquires an image captured by the camera 12. The audio input/output I/F 113 is an interface that is connected to a microphone 14 and a speaker 15, inputs audio through the microphone 14 and outputs audio through the speaker 15. The display I/F 114 is an interface that is connected to the display 13 such as a liquid crystal display (LCD) and outputs display data to the display 13.

Although the display 13 is used in the embodiment, another display device such as a projector may be connected instead of the display 13.

The call terminal 11 outputs an image acquired from the camera 12 or the audio input through the microphone 14 to the relay device 30 via the network I/F 111 when establishing a call to another call terminal, for example, under control by the CPU 101 executing the program 104. Furthermore, the call terminal 11 outputs audio from another call terminal that have been relayed by the relay device 30 and input via the network I/F 111 through the speaker 15 and displays images from another call terminal on the display 13 in the same manner. In this manner, the call terminal 11 establishes a call with another call terminal through the images and the audio, that is, what is called a teleconference.

Figure 3:
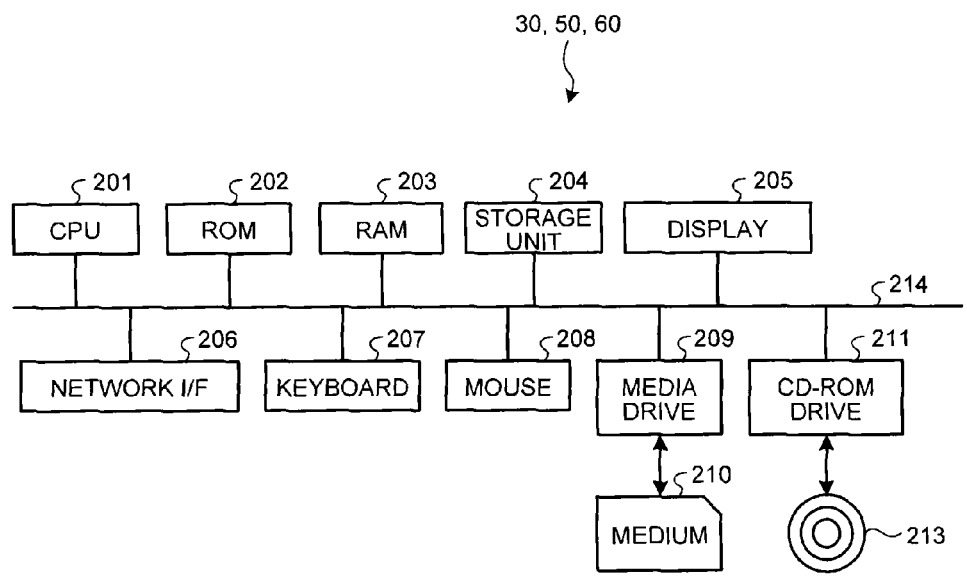
FIG. 3 is a block diagram illustrating the hardware configurations of a relay device, a remote communication management server, and an update server.

The following describes the hardware configurations of the relay device 30, the remote communication management server 50, and the update server 60. FIG. 3 is a block diagram illustrating the hardware configurations of the relay device 30, the remote communication management server 50, and the update server 60. As illustrated in FIG. 3, each of the relay device 30, the remote communication management server 50, and the update server 60 includes a CPU 201, a ROM 202, a RAM 203, a storage unit 204, a display 205, a network I/F 206, a keyboard 207, a mouse 208, a media drive 209, and a CD-ROM drive 211 and the respective parts are configured to be connected to one another through a bus 214. Each of the relay device 30, the remote communication management server 50, and the update server 60 is an apparatus such as a personal computer (PC) or a work station (WS).

The CPU 201 develops a program stored in the ROM 202 or the storage unit 204 on the RAM 203 and executes it sequentially so as to control operations of the own device centrally. The storage unit 204 is a HDD, an SSD, or the like and stores therein data in a readable/writable manner. For example, in the update server 60, update-related information and the like are stored in the storage unit 204.

The display 205 is a liquid crystal display (LCD), for example. The network I/F 206 is an interface that is connected to the communication network 2 and makes data communication. The keyboard 207 and the mouse 208 receive operation input by the user. The media drive 209 is a drive device that performs reading/writing from/into a medium 210 such as the optical disk. The CD-ROM drive 211 is a drive device that performs reading from a CD-ROM 213. For example, in the update server 60, the latest update-related information is provided by the medium 210 or the CD-ROM 213 and is stored in the storage unit 204.

Figure 4:
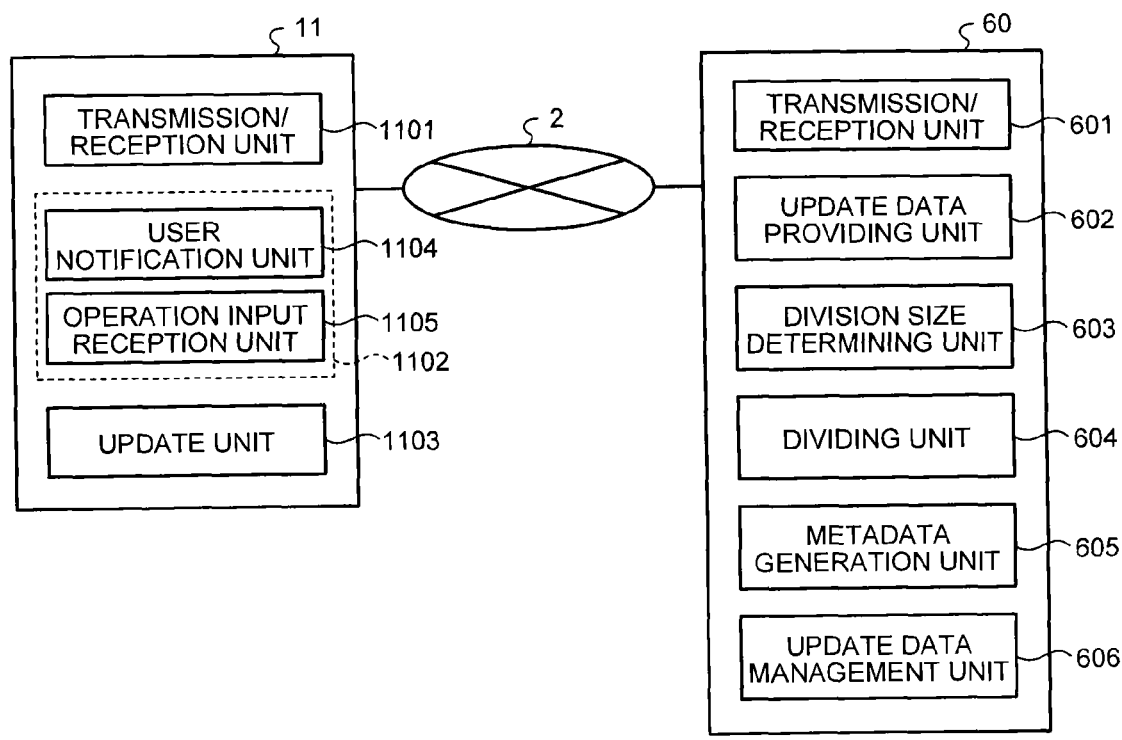
FIG. 4 is a block diagram illustrating functions of the call terminal and the update server.

The following describes the functions of the call terminal 11 and the update server 60 in detail. FIG. 4 is a block diagram illustrating the functions of the call terminal 11 and the update server 60. The respective functions of the call terminal 11 and the update server 60 may be configured by software that is executed by the CPU or the like or hardware.

The call terminal (communication device) 11 includes a transmission/reception unit 1101, a user interface unit 1102, and an update unit 1103, and receives update data for an application and performs update. The transmission/reception unit 1101 transmits and receives data to and from the update server 60 through the communication network 2. To be specific, the transmission/reception unit 1101 transmits and receives the data to and from the update server 60 by starting a communication session with the update server 60 using a predetermined communication protocol based on the communication address of the update server 60 that has been previously set to setting information or the like in the storage unit 105 or the communication address of the update server 60 that has been acquired by inquiring the remote communication management server 50.

The transmission and reception of the data causes the transmission/reception unit 1101 to acquire the update-related information that is managed by the update server 60. Furthermore, the call terminal 11 notifies a server of communication band information capable of being used by the call terminal 11 when transmitting the data. As the communication band information, information previously set to the call terminal through a user interface unit is used.

The user interface unit 1102 is an interface that controls audio output through the speaker 15, a display screen of the display 13, reception of the operation input with the operation unit 108 by the user, and the like so as to control information transmission between the user and the call terminal 11. To be specific, the user interface unit 1102 includes a user notification unit 1104 and an operation input reception unit 1105. The user notification unit 1104 performs various notifications to the user with the audio output through the speaker 15 and the display screen of the display 13. The operation input reception unit 1105 receives the operation input with the operation unit 108 by the user.

The update unit 1103 functions as a determination unit and an update processing unit and executes update of the program 104 and the various pieces of setting information stored in the storage unit 105 based on the update-related information that the transmission/reception unit 1101 has acquired from the update server 60. The update that is executed by the update unit 1103 will be described in detail in update processing (step S16).

The update server (communication device) 60 includes a transmission/reception unit 601, an update data providing unit 602, a division size determining unit 603, a dividing unit 604, a metadata generation unit (relevant information generation unit) 605, and an update data management unit 606. The update server 60 transmits update data and information relating to the update data to the call terminal 11.

The transmission/reception unit 601 transmits and receives data to and from the call terminal 11 through the communication network 2. To be specific, the transmission/reception unit 601 transmits and receives the data to and from the call terminal 11 by starting a communication session using the predetermined communication protocol in response to the request from the call terminal 11 through the communication network 2.

The update data providing unit 602 provides the update-related information that is managed by the update server 60 to the call terminal 11 in response to the request from the call terminal 11 to and from which the transmission/reception unit 601 transmits and receives data. Furthermore, the update data providing unit 602 receives a metadata acquisition request and band information from the call terminal 11. The band information is information indicating a band that the call terminal 11 can use for communication.

Figures 5, 6:
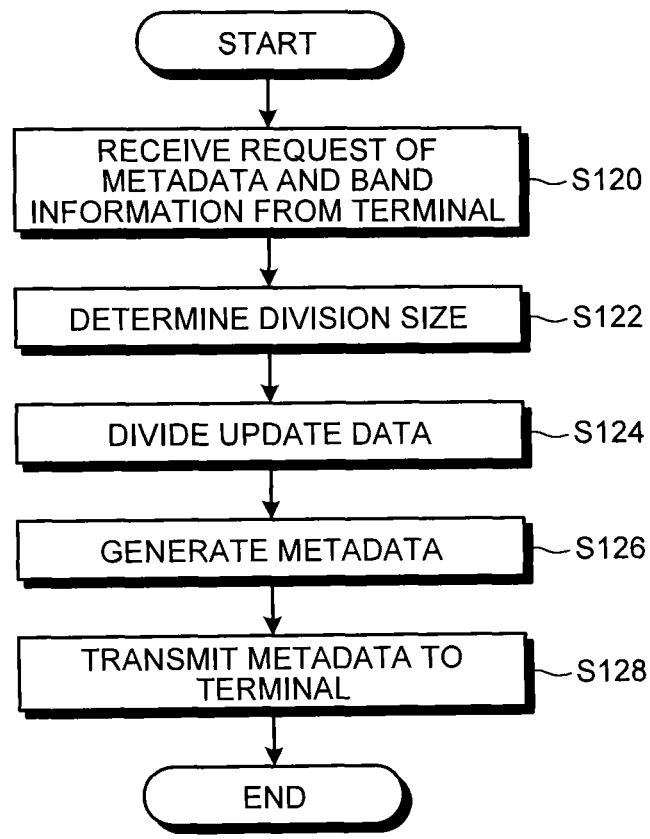
FIG. 5 is a flowchart illustrating an example of operations of the update server.
FIG. 6 is a view illustrating a correspondence table.

The division size determining unit 603 determines a division size when the update data is divided into a plurality of pieces of data based on the band information. For example, the division size determining unit 603 has a correspondence table in which correspondence between the band information and the division size is previously defined as illustrated in FIG. 6. The division size determining unit 603 determines the division size when the update data is divided into the pieces of data in accordance with the band information of the call terminal 11 from which the metadata acquisition request has been received by referring to the correspondence table. For example, when the call terminal 11 notifies of "400 Kbps" as the band information when requesting the metadata, the division size determining unit 603 determines the division size to "512 Kbyte".

The dividing unit 604 divides the update data into the pieces of data using the division size determined by the division size determining unit 603.

The metadata generation unit 605 generates metadata (relevant information) as the information relating to the update data divided into the pieces of data by the dividing unit 604 in combination with the pieces of divided data. An example of the metadata will be described with reference to FIG. 8.

The update data management unit 606 holds the metadata (relevant information) relating to the update data divided into the pieces of data by the dividing unit 604. The update data management unit 606 may hold pieces of data that have been previously divided. In the same manner for the metadata, the update data management unit 606 may previously hold pieces of metadata corresponding to the pieces of data that have been previously divided.

FIG. 5 is a flowchart illustrating an example of operations of the update server 60. As illustrated in FIG. 5, in the update server 60, the update data providing unit 602 receives the metadata acquisition request and the band information from the call terminal 11 through the transmission/reception unit 601 (step S120).

The division size determining unit 603 determines the division size when the update data is divided into a plurality of pieces of data based on the band information (step S122).

The dividing unit 604 divides the update data into the pieces of data using the division size determined by the division size determining unit 603 (step S124).

The metadata generation unit 605 generates relevant information in accordance with the pieces of data divided by the dividing unit 604 (step S126).

The update data management unit 606 transmits metadata to the call terminal 11 (step S128). The call terminal 11 receives the update data divided into the division size based on the metadata.

Figure 7:
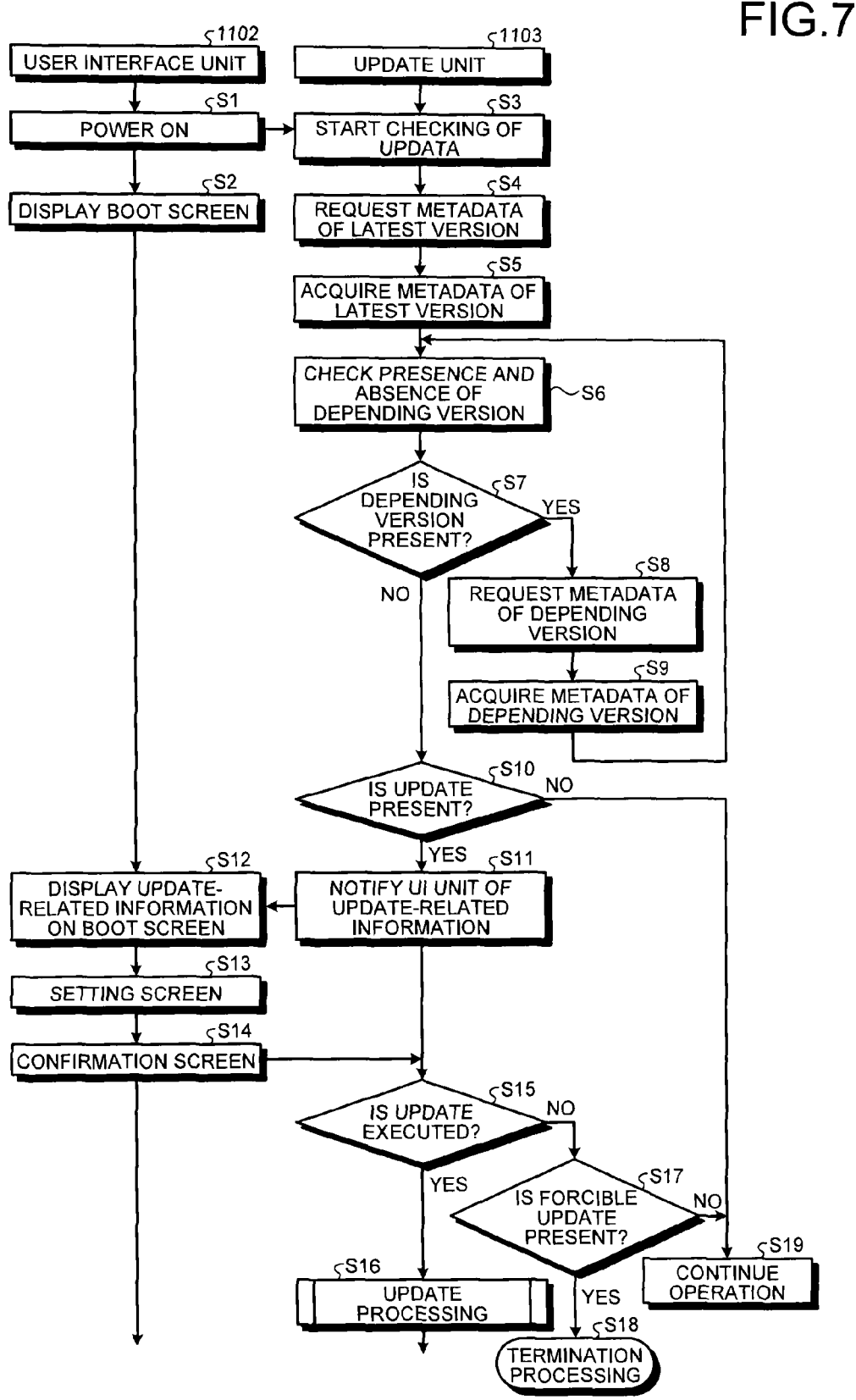
FIG. 7 is a flowchart illustrating an example of operations of the call terminal.

The operations of the call terminal 11 that are executed by the above-mentioned functional configuration are described in detail. FIG. 7 is a flowchart illustrating an example of the operations of the call terminal 11.

As illustrated in FIG. 7, the user interface unit 1102 turns ON the power supply of (powers ON) the own device in accordance with an operation with a power supply switch or the like of the operation unit 108 (step S1), and displays a boot screen on the display 13 (step S2). The boot screen is a display screen displaying a list of the call states of the respective call terminals 11 that have been obtained by inquiring the remote communication management server 50 under control by the CPU 101 (details thereof will be described later).

The update unit 1103 starts checking update of the own device at the time of the boot after the power supply is turned ON at S1 (step S3). In the following description, the program is updated but it is needless to say that various pieces of setting information are updated in the same manner.

When the checking of the update is started, the update unit 1103 requests metadata of the program of the latest version from the update server 60 through the transmission/reception unit 1101 (step S4) and acquires the metadata that the update data providing unit 602 provides in response to the request (step S5).

Details of the metadata will be described. FIG. 8 is a conceptual view illustrating an example of the metadata. As illustrated in FIG. 8, the metadata of each version has a structure including data items of "version", "dependency", "description", "files", "scriptname", "require_reboot", "force_update", and the like. The example as illustrated in FIG. 8 indicates that the update data for the application is divided into three files.

A version number like "1.0.2" is described for the "version". A version number like "1.0.1" indicating another version having a dependency relation with each other is described for the "dependency". Accordingly, the version number described in the data item of the "dependency" is checked so as to trace a version having the dependency relation. Details of the version like "It is sample data." are described for the "description". A list and storage destinations of the program (data files) as entity of the update that are managed by the update server 60 and checksums of these data files are described for the "files". Accordingly, the update unit 1103 acquires data files through the transmission/reception unit 1101 based on contents described in the data item of the "files" so as to execute the update relating to the version described in the metadata. A script name that is executed when the update is executed is described for the "scriptname". A flag ("true" or "false") indicating whether the device is rebooted after execution of the update is described for the "require_reboot". A flag ("true" or "false") indicating whether the update is forcible update is described for the "force_update".

The update of the program 104 involves device control for the network I/F 111, the image capturing element I/F 112, the audio input/output I/F 113, the display I/F 114, and the like in some cases. The update involving the device control requires reboot after the update. Based on this, "true" is described for the "require_reboot". As described above, the update of the program 104 includes the normal update and the forcible update. When the forcible update is performed, "true" is described for the "force_update".

Subsequently, the update unit 1103 checks presence and absence of a depending version based on the content described in the data item of the "dependency" in the acquired metadata (step S6). For example, as illustrated in FIG. 8, when a version number indicating another version like "1.0.1" is described for the data item of the "dependency", it is considered that the depending version is present. On the other hand, when nothing is described for the data item of the "dependency", it is considered that the depending version is absent.

Then, the update unit 1103 determines whether the depending version is present as a result of the checking at S6 (step S7). If the depending version is present (Yes at step S7), the update unit 1103 requests metadata of the program of the depending version from the update server 60 through the transmission/reception unit 1101 (step S8) and acquires the metadata of the depending version that is provided by the update data providing unit 602 in response to the request (step S9). Then, the process is returned to S6. Accordingly, the update unit 1103 traces versions depending on the latest version so as to acquire the metadata relating to the versions.

Subsequently, the update unit 1103 compares the version number described for the "version" in the metadata of the latest version and a version number of the program 104 stored in the storage unit 105 of the own devices so as to determine whether update of the own device is needed (that is to say, whether update has been already performed) (step S10). To be specific, when the version number of the latest version and the version number of the program 104 are identical, it is determined that no update necessary for the own device is present (that is, the update has been already performed) because the program 104 is the latest version. On the other hand, when the version number of the latest version and the version number of the program 104 are not identical, it is determined that update necessary for the own device is present (that is, the update has not been performed) because the program 104 is an old version. If no update necessary for the own device is present (No at step S10), it is not necessary to execute the update, so that a normal operation is continued (step S19).

If the update necessary for the own device is present (Yes at step S10), the update unit 1103 notifies the user interface unit 1102 of the update-related information (step S11). To be specific, the update unit 1103 notifies the user interface unit 1102 of data items other than data items unnecessary for the notification to the user, such as "files" and "scriptname", in the metadata of the latest version and the metadata of the version depending on the latest version as the update-related information.

The user notification unit 1104 of the user interface unit 1102 displays the presence of the update necessary for the own device on the boot screen of the display 13 based on the update-related information notified by the update unit 1103 at S11 so as to notify the user of it (step S12).

Figure 9:
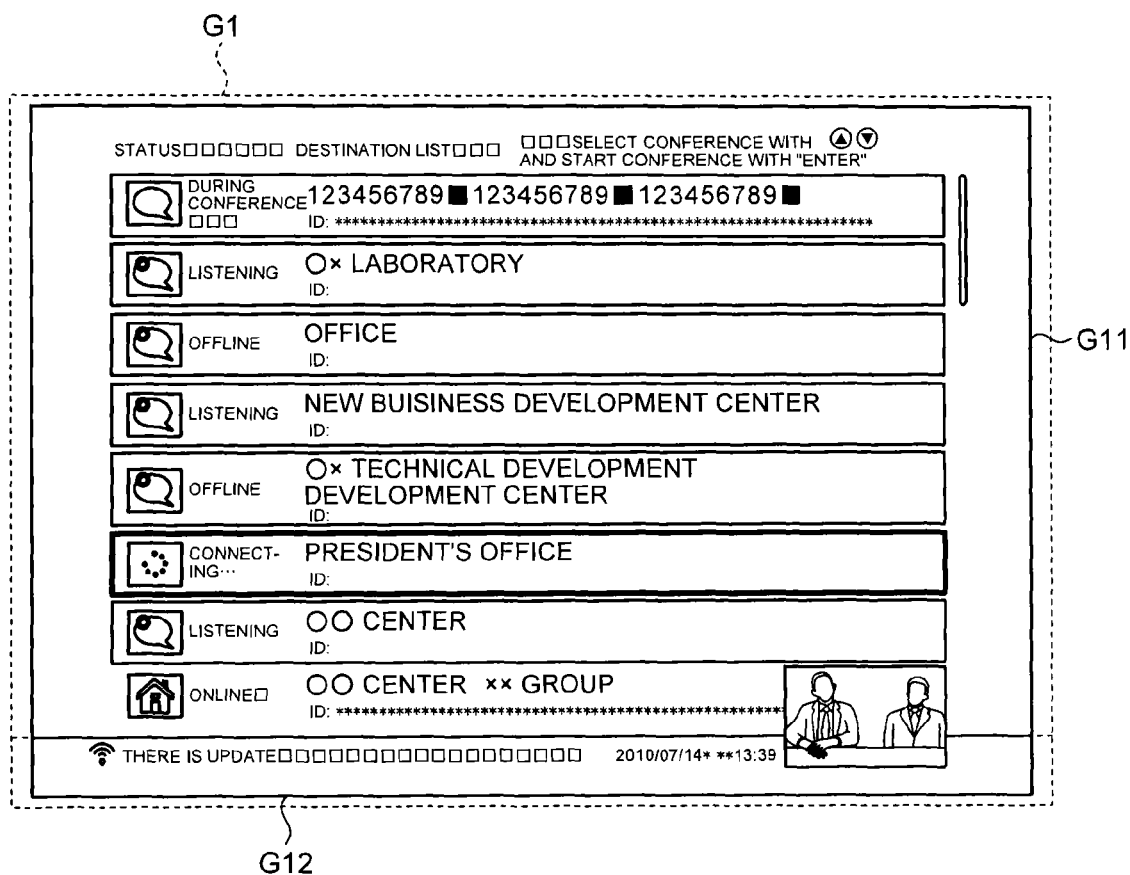
FIG. 9 is a conceptual view illustrating an example of a boot screen.

Details of the boot screen are described. FIG. 9 is a conceptual view illustrating an example of a boot screen G1. As illustrated in FIG. 9, the boot screen G1 is configured to include a main screen G11 displaying a list of the call states of the respective call terminals and a status screen G12 displaying the status of the own device. When the user notification unit 1104 is notified of the update-related information by the update unit 1103, the user notification unit 1104 displays the presence of the update on the status screen G12 so as to notify the user of it. As the display indicating the presence of the update, a previously set icon image may be displayed on the main screen G11 and a layout thereof is not limited to that as illustrated in FIG. 9. In screen examples (FIGS. 9 to 12, 14, 15, and the like) as illustrated in the drawings, portions expressed by outlined or filled squares indicate regions on which a message is displayed possibly and correspond to a message display region previously reserved on the system, for example.

When "true" is described for the "force_update" among the data items contained as the update-related information, the user notification unit 1104 displays that the update present in the own device is forcible update on the boot screen G1 so as to notify the user of it. To be specific, the user notification unit 1104 may display that the update is the forcible update on the status screen G12 or display the list displayed on the main screen G11 in a gray-out fashion so as to notify the user of invalidity of operations other than the update.

When the operation input reception unit 1105 of the user interface unit 1102 receives an operation direction for performing various settings such as the update with the notification to the user at S12, the user interface unit 1102 displays a setting screen on the display 13 (step S13).

Figure 10:
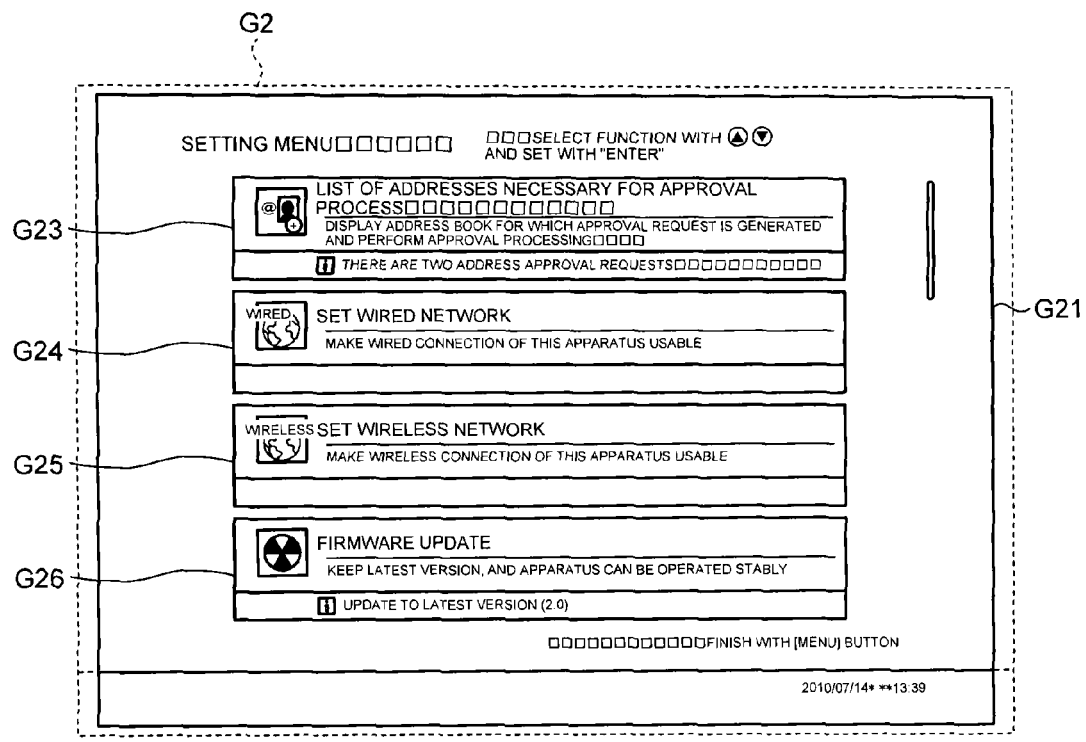
FIG. 10 is a conceptual view illustrating an example of a setting screen.

FIG. 10 is a conceptual view illustrating an example of a setting screen G2. As illustrated in FIG. 10, the setting screen G2 has a configuration including a main screen G21 displaying setting buttons G23 to G26 for receiving a selection operation by the user through the operation input reception unit 1105 and performing various settings. The setting button G26 among the setting buttons G23 to G26 is a button for directing to execute update. When the update-related information is not notified by the update unit 1103 and no update is present in the own device, a selection operation of the setting button G26 is made invalid by displaying it in a gray-out fashion or the like. In contrast, when the update-related information is notified by the update unit 1103 and the update is present in the own device, the gray-out of the setting button G26 is cancelled so as to make a state of receiving the selection operation by the user through the operation input reception unit 1105. In this case, a version number of the latest version to which the update is performed may be noted on the setting button G26 based on the description for the "version" as the data item contained as the update-related information. The example as illustrated in FIG. 10 indicates that update to the latest version having the version number of 2.0 is performed. It should be noted that a status screen displaying the status of the own device may be displayed on the setting screen G2.

When the selection operation of the setting button G26 is performed at S13, the user interface unit 1102 displays a confirmation screen for confirming execution of the update on the display 13 (step S14).

Figure 11:
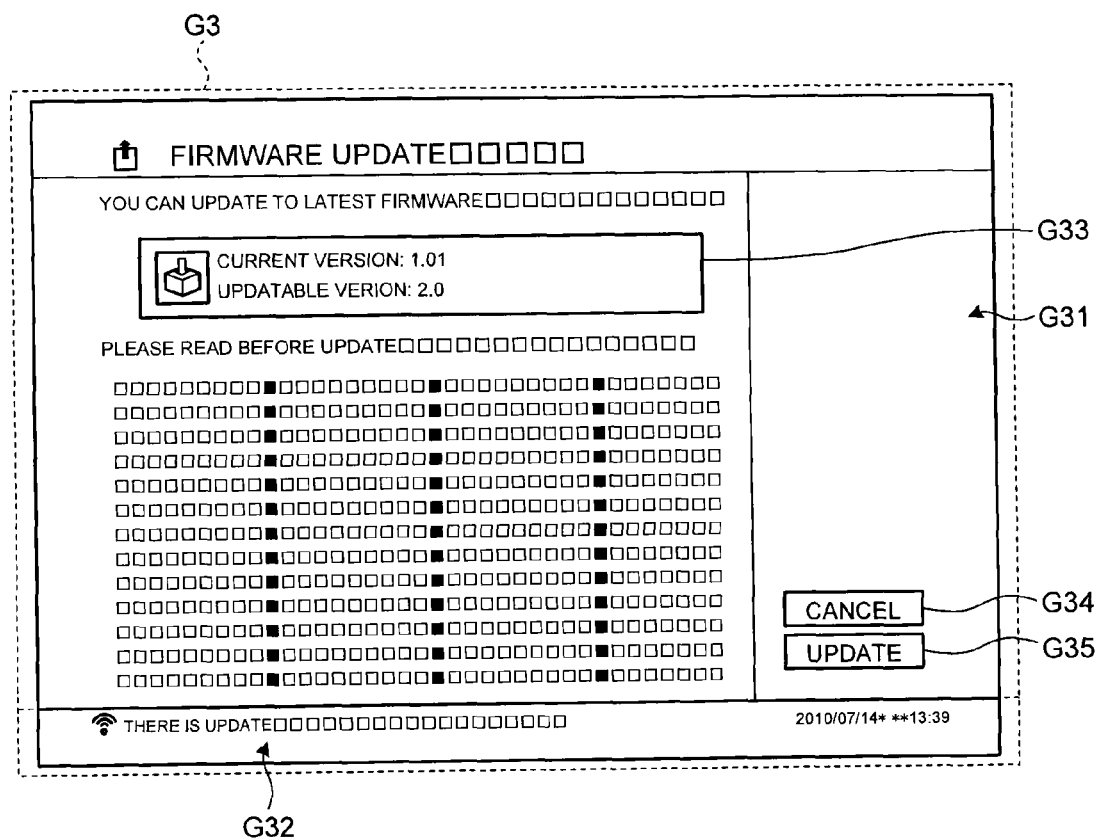
FIG. 11 is a conceptual view illustrating an example of a confirmation screen.

FIG. 11 is a conceptual view illustrating an example of a confirmation screen G3. As illustrated in FIG. 11, the confirmation screen G3 is configured to include an update display G33 displaying contents of the update that is executed, a main screen G31 containing operation buttons G34 and G35 for receiving directions to execute and cancel the update based on the contents from the user, and a status screen G32 displaying the status of the own device. The current version as the version number of the program 104 of the own device and pieces of information such as the version number of the latest version to which the update is performed based on the description for the "version" as the data item contained as the update-related information are displayed on the update display G33 so as to notify the user of them. Accordingly, the user can check the version number to which update is performed from the display contents on the update display G33. It should be noted that information whether reboot is performed may be further displayed on the update display G33 of the confirmation screen G3.

Figure 12:
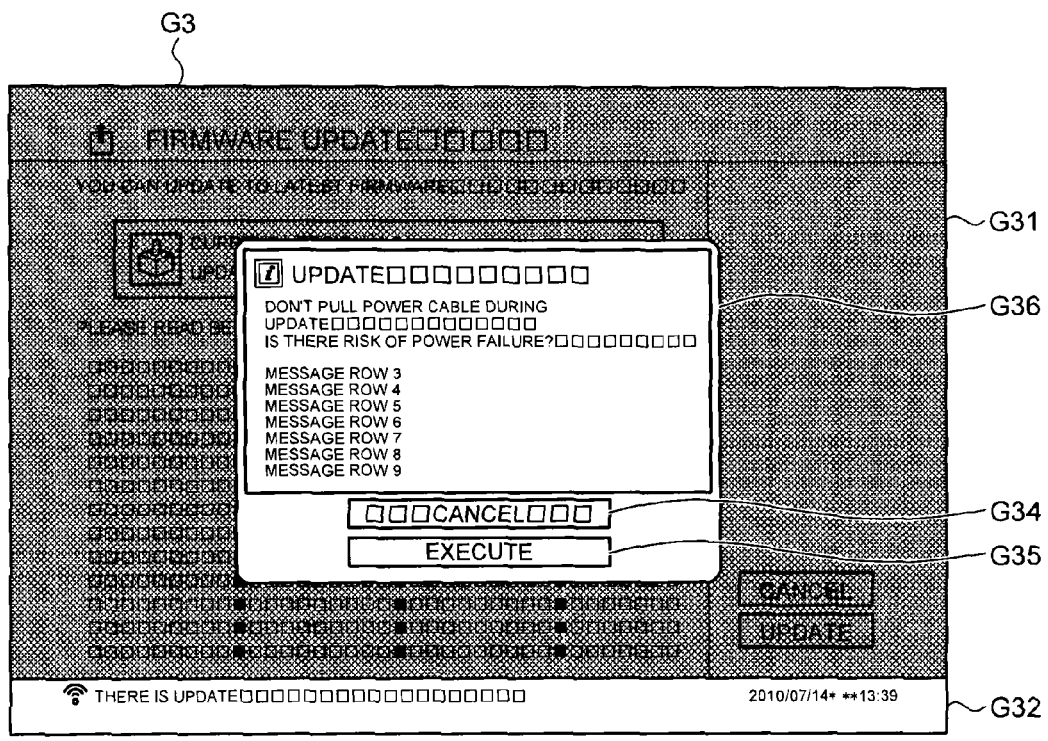
FIG. 12 is a conceptual view illustrating an example of a confirmation window.

FIG. 12 is a conceptual view illustrating an example of a confirmation window G36. When the operation button G35 for directing to execute the update is selected on the confirmation screen G3, the confirmation window G36 for prompting the user to check again may be displayed. The pieces of information such as the version number of the latest version to which the update is performed, previously set precautions at the time of the update, and the like are displayed on the confirmation window G36. On the confirmation screen G3, the confirmation window G36 is displayed when the update is directed to be executed so as to prompt the user to pay attention. It should be noted that the information indicating whether the reboot is performed may be further displayed on the confirmation window G36.

Returning back to FIG. 7, the update unit 1103 determines whether the update is executed based on the selection operation with the operation button G34 or G35 on the confirmation screen G3 (step S15). If the operation button G35 for directing to execute the update is selected (Yes at step S15), the update unit 1103 executes the update processing based on the acquired metadata (step S16).

If the operation button G35 is not selected in the case where the operation button G34 for cancelling the execution of the update is selected or the like (No at step S15), the update unit 1103 determines whether the forcible update is included in the updates that have not been executed based on the description for the "force_update" in the acquired metadata (step S17). If the forcible update is included (Yes at step S17), the update unit 1103 performs termination processing of terminating processing of the own device (step S18) and powers OFF the device. Even the call cannot be established unless the forcible update is executed. For avoiding this, the device is powered OFF so as to prevent wasteful operations from being made before happens. On the other hand, if the forcible update is not included (No at step S17), the update unit 1103 does not execute the update at the current time and continues the normal operation. This enables the user to give preference to call over the update.

That is to say, when the update of the own device is present, the call terminal 11 notifies the user of the presence of the update through the user notification unit 1104 of the user interface unit 1102. Then, in the call terminal 11, the operation input reception unit 1105 receives the selection operation indicating whether the update is executed from the user. When the selection operation of executing the update is made, the update unit 1103 executes the update processing. Accordingly, when the update to be executed in the own device is present, the call terminal 11 enables the user to select to execute the update.

Figure 13:
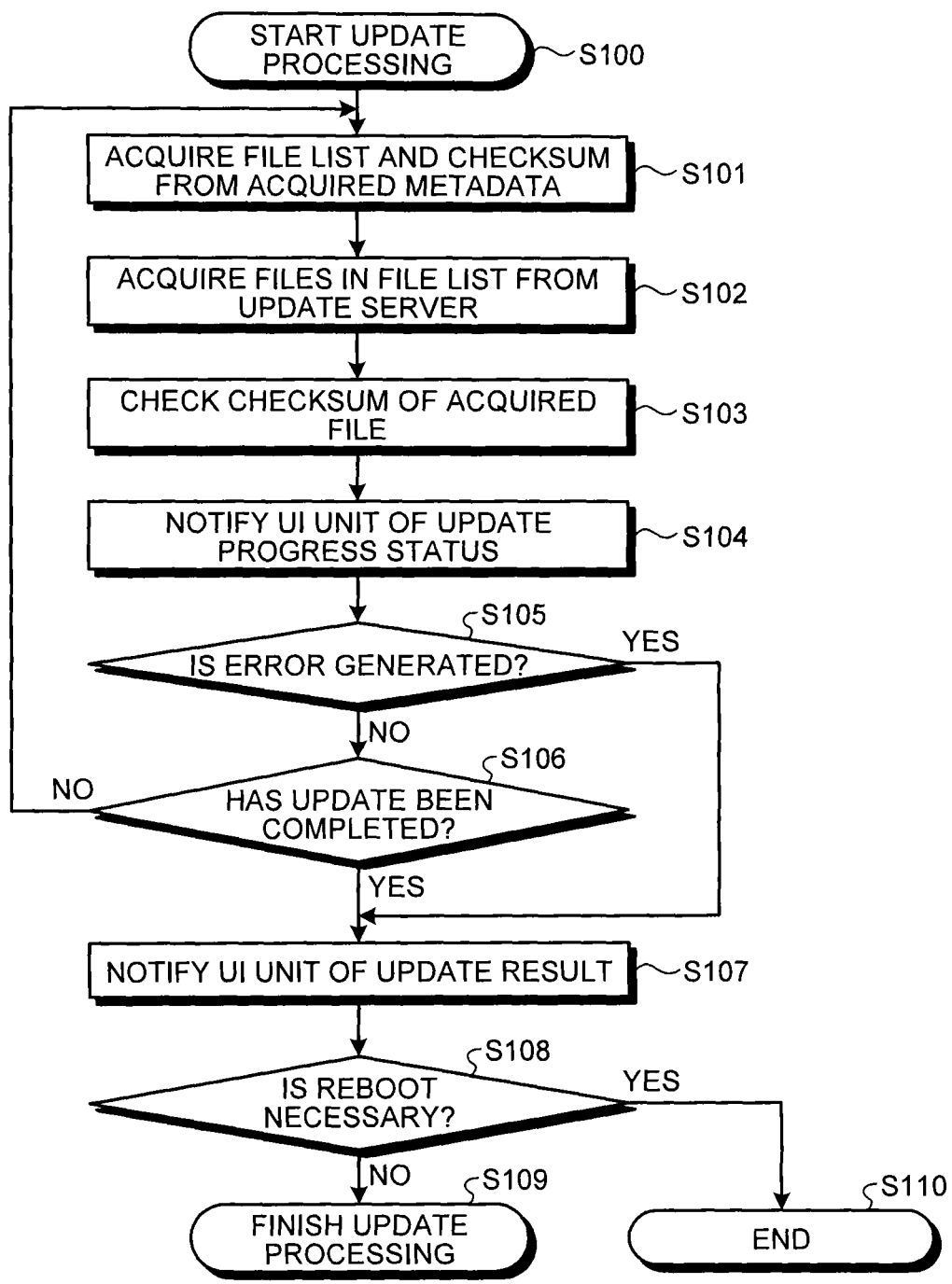
FIG. 13 is a flowchart illustrating an example of update processing.

Details of the update processing (step S16) are described. FIG. 13 is a flowchart illustrating an example of the update processing.

As illustrated in FIG. 13, when the update processing is started (step S100), the update unit 1103 stops the functions of the interface units including the image capturing element I/F 112 and the audio input/output I/F 113 for connecting with the external devices including the camera 12, the microphone 14, and the speaker 15. When the interface units are operated, the update becomes error in some cases because the program 104 relating to the corresponding interface unit is being used. In order to prevent the error before happens, the update unit 1103 stops the functions of the above-mentioned interface units with the start of the update processing.

Next, the update unit 1103 acquires a program file list as the entity of the update from the "files" in the acquired metadata and the checksums of these files (step S101). When pieces of metadata of a plurality of versions having the dependency relation are acquired, the pieces of processing at S101 to S106 are performed in the order from the version having the oldest version number.

Subsequently, the update unit 1103 acquires the files on the file list acquired at S101 from the update server 60 (step S102), and checks the checksums of the acquired files (step S103). Then, the update unit 1103 notifies the user interface unit 1102 of an update progress status (step S104). The notification of the progress status is made for notifying the user interface unit 1102 of a file to which the pieces of processing at S102 and S103 have been finished among the files contained in the file list. When the update of the versions having the dependency relation is performed, a version to which the update has been finished may be notified. The user interface unit 1102 displays the notified update progress status on the screen of the display 13 so as to notify the user of it.

Figure 14:
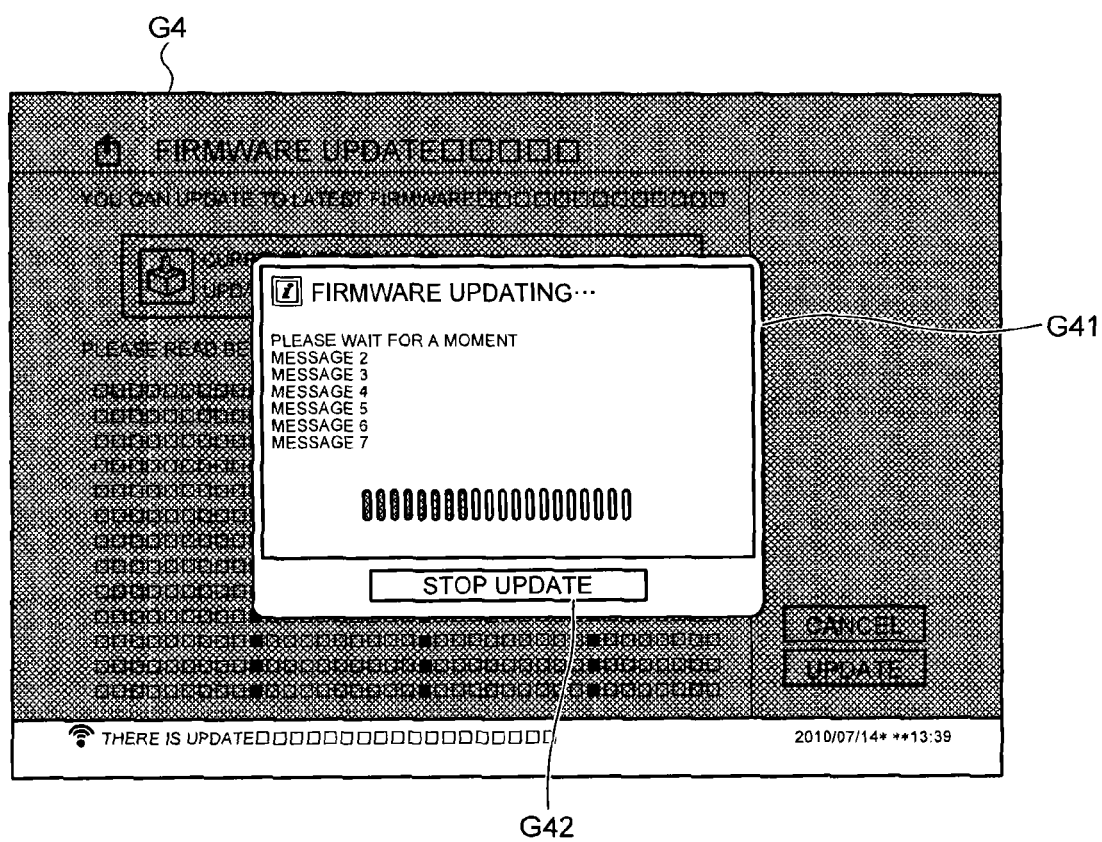
FIG. 14 is a conceptual view illustrating an example of an update screen.

FIG. 14 is a conceptual view illustrating an example of an update screen G4. As illustrated in FIG. 14, the update screen G4 is a screen displayed by the user interface unit 1102 on the display 13 during the update processing by the update unit 1103. On the update screen G4, an update status window G41 displaying the update progress status notified by the update unit 1103 and an operation button G42 for directing to stop the update are displayed. The user can check the update progress state with the display contents on the update status window G41.

In addition, remaining time of the update and a current line speed may be displayed on the update screen G4 in real time. This case provides an advantage that the user can grasp the update status more specifically.

Then, the update unit 1103 determines presence and absence of generation of an error (step S105). If the error is generated (Yes at step S105), the process advances to S107 through the pieces of processing at S101 to S106. At S105, the cases where stop of the update by the operation with the operation button G42 on the update screen G4 and the version to which the update has been performed at S102 and S103 requires reboot are also determined as errors in addition to an error that is generated during the update for some reason (for example, difference in the checksum at S103). Accordingly, when the update is performed in the order from the version having the oldest version number, it is considered that the pieces of processing at S101 to S106 have been experienced at a stage where the update to the version requiring the reboot has been performed.

If no error is generated (No at step S105), the update unit 1103 determines whether update for all the versions relating to the acquired metadata has been completed (step S106). If the update for all the versions has not been completed (No at step S106), the process is returned to S101 and the update processing is continued. If the update for all the versions has been completed (Yes at step S106), the process advances to S107 through the pieces of processing at S101 to S106.

At S107, the update unit 1103 notifies the user interface unit 1102 of the update result by the pieces of processing at S106 and S107. The user interface unit 1102 displays the notified update result on the screen of the display 13 so as to notify the user of it.

Figure 15:
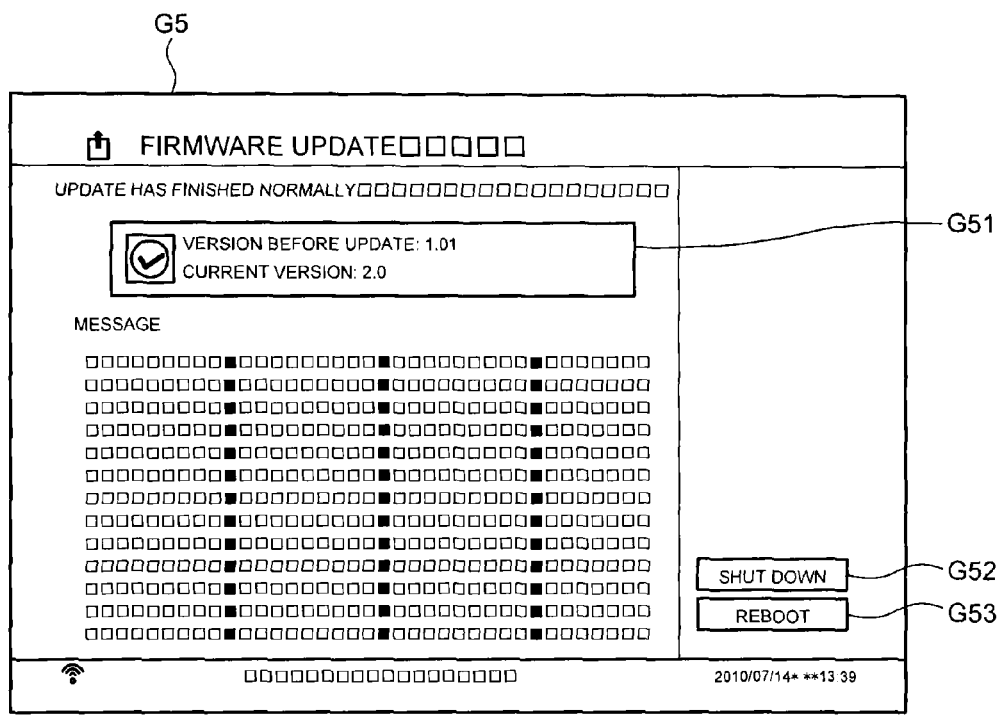
FIG. 15 is a conceptual view illustrating an example of the confirmation screen.

FIG. 15 is a conceptual view illustrating an example of a confirmation screen G5. As illustrated in FIG. 15, the user interface unit 1102 that has received the update result displays an update result G51 by the pieces of processing at S106 and S107 and operation buttons G52 and G53 for receiving an operation of shutdown or reboot after the update on the confirmation screen G5. The information relating to the version before the update and the information relating to the current version by the update at S106 and S107 are displayed on the update result G51. The user can check the update result with the display contents on the update result G51.

Then, the update unit 1103 determines whether the reboot is necessary based on the description for the "require_reboot" that is contained in the metadata used for the update performed at S106 and S107 (step S108). If the reboot is not necessary (No at step S108), the update unit 1103 finishes the update processing without rebooting (step S109). If the reboot is necessary (Yes at step S108), the update unit 1103 reboots the own device and finishes the processing (step S110). Thus, when the update requiring the reboot is executed, the reboot is made after the update without an operation by the user.

Modification of Call Terminal 1

Figures 16, 17:
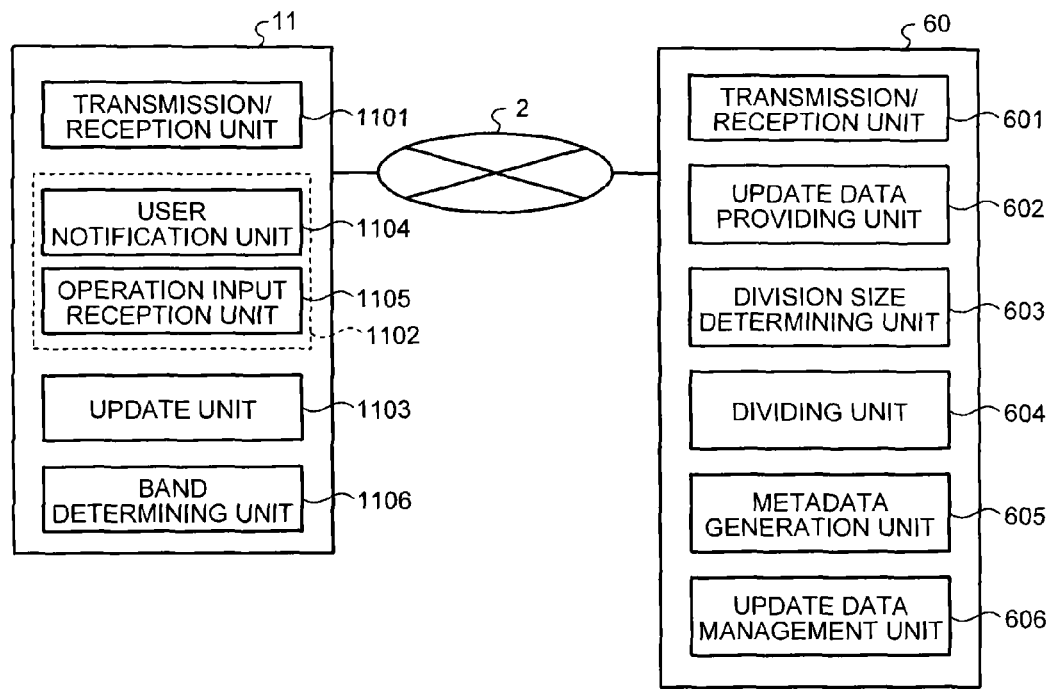
FIG. 16 is a block diagram illustrating a modification of a call terminal and functions of the update server.
FIG. 17 is a table illustrating an example of reception history that is used when a band determining unit determines a band capable of being used for communication.

The following describes a modification of the call terminal 11. FIG. 16 is a block diagram illustrating the modification of the call terminal 11 and the functions of the update server 60. The modification of the call terminal 11 includes a band determining unit 1106 in addition to the functions of the call terminal 11 as illustrated in FIG. 4.

The band determining unit 1106 determines a communication band capable of being used for downloading the update data. To be specific, the band determining unit 1106 determines a band capable of being used for communication based on a communication band when update data has been received in the past and sets it as the band information. The band determining unit 1106 also has a function of measuring a band capable of being used for communication before the update data is received, determining a band capable of being used for communication based on a measurement result, and setting the determined band as the band information.

FIG. 17 is a table illustrating an example of reception history that is used when the band determining unit 1106 determines the band capable of being used for communication. The band determining unit 1106 calculates an average value of bands used for downloading from the capacity of downloaded data and time taken to download when the update data has been downloaded in the past. The band determining unit 1106 holds it in the call terminal 11 as the history table as illustrated in FIG. 17. The band determining unit 1106 determines the average value of the communication band in the latest download, for example, as a usable band that is notified to the update server 60 at a subsequent update time using the history table so as to make notification of the band information. The update server 60 determines a division size using the correspondence table as illustrated in FIG. 6 based on the band information notified by the call terminal 11.

Figure 18:
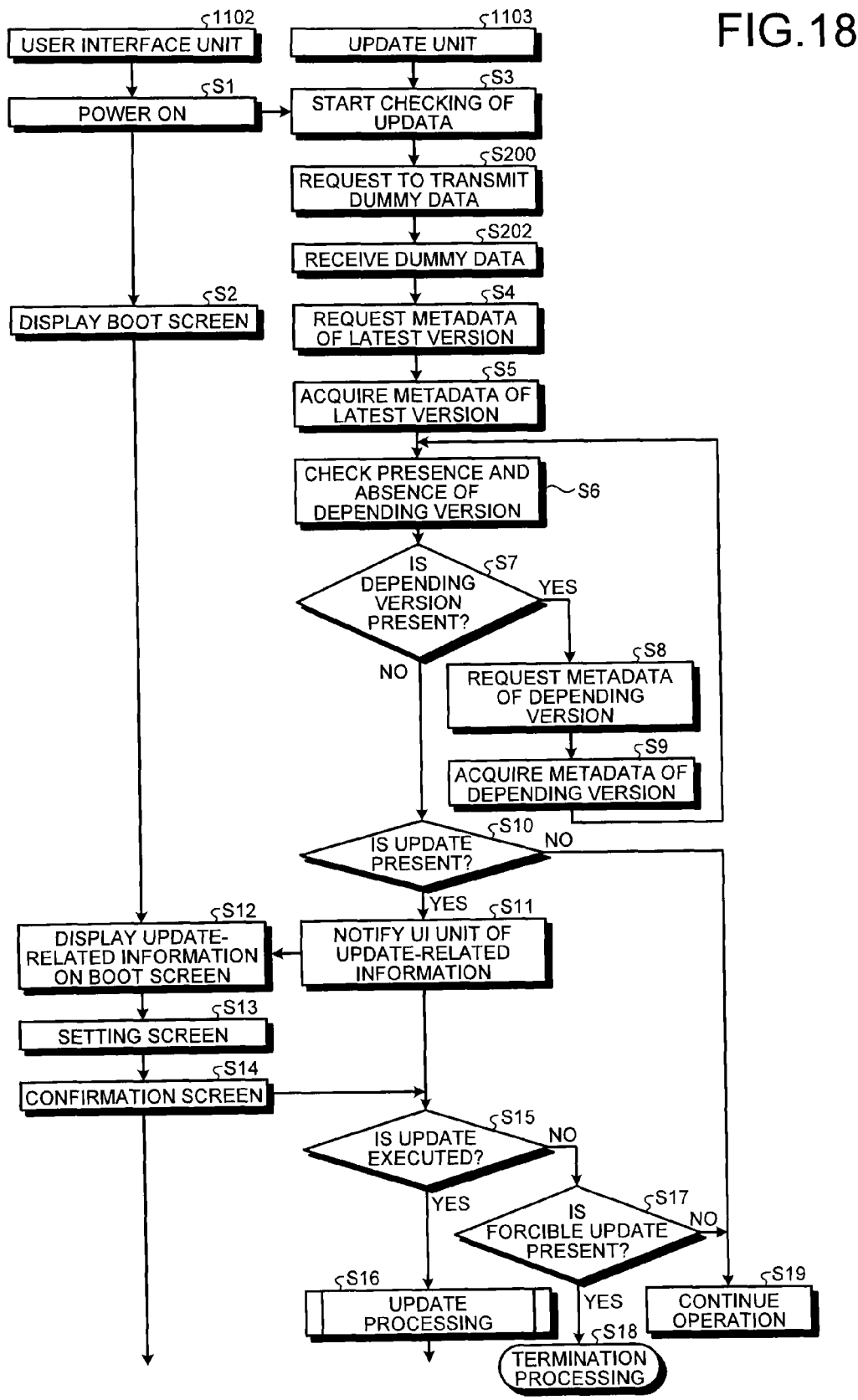
FIG. 18 is a flowchart illustrating operations when the band determining unit measures the band capable of being used for communication so as to determine a usable band.

FIG. 18 is a flowchart illustrating operations when the band determining unit 1106 measures the band capable of being used for communication so as to determine the usable band. In FIG. 18, the same reference numerals denote the pieces of processing that are substantially the same as the pieces of processing as illustrated in FIG. 7.

As illustrated in FIG. 18, first, the update unit 1103 starts checking update (step S3), and then, requests transmission of dummy data from the update server 60 (step S200). The dummy data is data in an update data format that is held by the update server 60, for example, in order to measure an actual download band and is data that is not used for actual update.

The update unit 1103 receives the dummy data transmitted from the update server 60 in response to the request from the call terminal 11 through the transmission/reception unit 1101 (step S202). The band determining unit 1106 determines a usable band that is notified to the update server 60 from the capacity of the dummy data and time taken to download it so as to make notification. The update server 60 determines the division size using the correspondence table as illustrated in FIG. 6 based on the band information notified by the call To be specific, the communication system 1 may be a video phone system, an audio conference system, a voice phone system, a personal computer (PC) screen sharing system, a telephone system including an internet protocol (IP) telephone and an Internet telephone. Furthermore, the communication system 1 may be a car navigation system. For example, one of the call terminals 11 corresponds to a car navigation device automatically mounted on a car and the other of the call terminals 11 corresponds to a management terminal or a management server of a management center managing the car navigation or a car navigation device mounted on another car. Moreover, the communication system 1 may be configured as a content distribution system that distributes video images such as movies, dramas, televisions, and contributed moving images and electronic data such as electronic books.

The remote communication management server 50 and the update server 60 in the above-mentioned embodiment may be constructed by a single computer or a plurality of computers to which the respective parts (functions or units) are arbitrarily assigned in a divided manner.

The division size determining unit 603 is not limited to be included in the update server 60 and may be included in the call terminal 11.

The present invention enables applications to be updated efficiently for any of a plurality of communication devices having different usable communication bands.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication system including a first communication device and a second communication device, the communication system comprising:
  the first communication device comprising:
    first circuitry configured to
    determine a band information capable of being used for communication; and
    transmit the band information to the second communication device; and
  the second communication device comprising:
    second circuitry configured to
    determine a division size when update data for an application that is executed by the first communication device is divided into a plurality of pieces of data based on the band information transmitted from the first communication device, the band information indicating a band capable of being used for communication by the first communication device;
    divide the update data into a plurality of pieces of data in accordance with the determined division size; and
    generate relevant information relating to the pieces of data,
    wherein
      the second communication device transmits the relevant information to the first communication device, and
      the first communication device receives the update data divided into the division size to perform update in accordance with the relevant information.

2. The communication system according to claim 1, wherein
  the first communication device includes the first circuitry configured to determine the band information based on a communication band when having received the update data and transmits the determined band information to the second communication device.

3. The communication system according to claim 1, wherein
  the first communication device includes the first circuitry configured to measure a band before receiving the update data and determine the band information based on a measurement result, and transmits the determined band information to the second communication device.

4. A communication method that is performed by a communication system including a first communication device and a second communication device, the communication method comprising:
  determining a division size when update data for an application that is executed by the first communication device is divided into a plurality of pieces of data based on band information indicating a band capable of being used for communication by the first communication device;
  dividing the update data into a plurality of pieces of data in accordance with the determined division size;
  generating relevant information relating to the pieces of divided data;
  transmitting, by the second communication device, the relevant information to the first communication device;
  receiving, by the first communication device, the update data divided into the division size to perform update in accordance with the relevant information;
  determining, by the first communication device, a band capable of being used for communication based on a communication band when having received the update data; and
  transmitting, by the first communication device, the determined band to the second communication device as the band information.

5. A non-transitory computer-readable medium comprising computer readable program codes, performed by a computer, the program codes when executed causing the computer to execute:
  determining a division size when update data for an application is divided into a plurality of pieces of data based on band information indicating a band capable of being used for communication by a communication device that receives the update data to perform update;
  dividing the update data into a plurality of pieces of data in accordance with the determined division size;
  generating relevant information relating to the pieces of divided data;
  transmitting the relevant information to the communication device;

determining a hand capable of being used for communication based on a communication band when having received the update data; and transmitting the determined band to the second communication device as the band information.

* * * * *